United States Patent Office 3,022,784
Patented Feb. 27, 1962

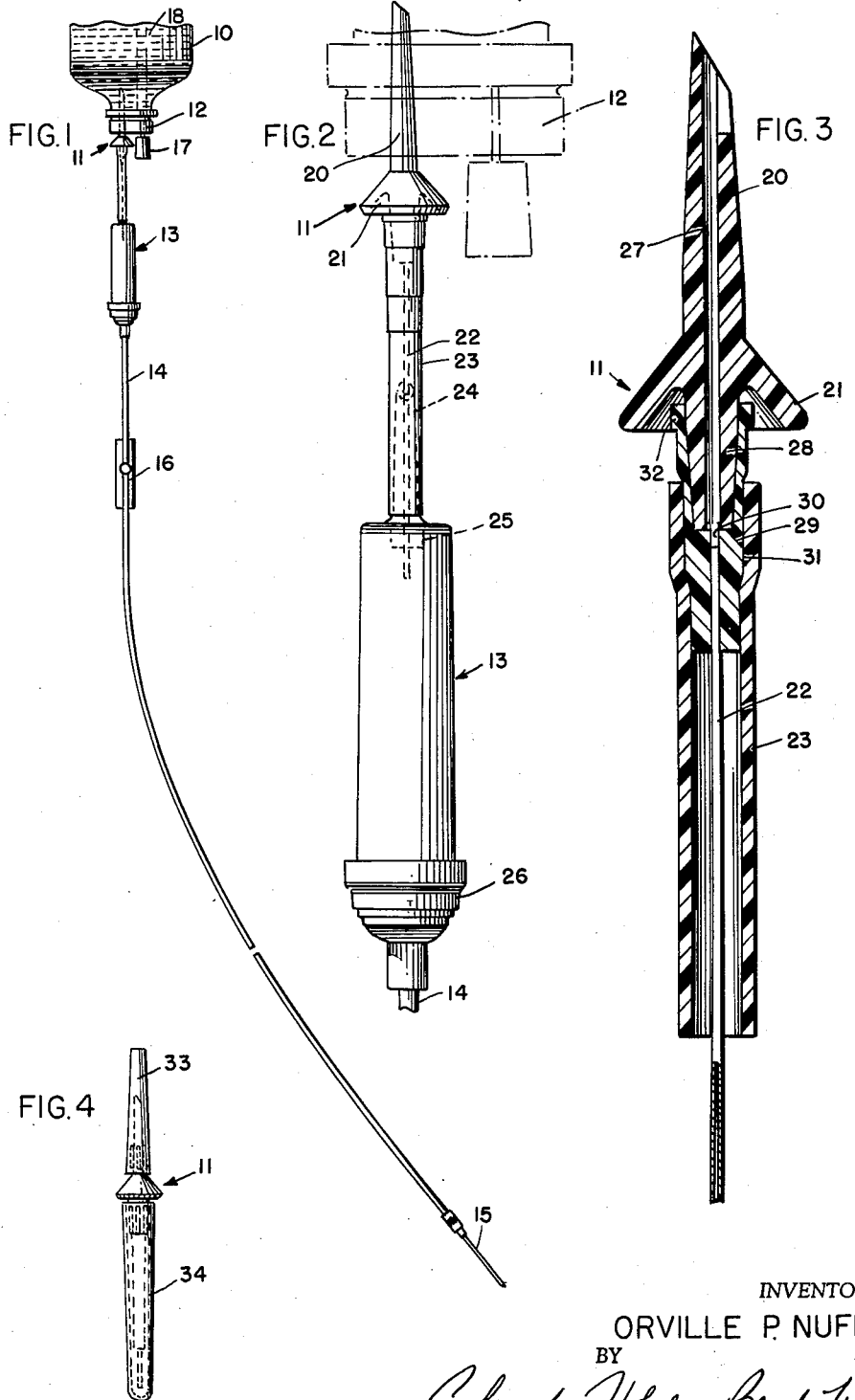

3,022,784
INTRAVENOUS ADMINISTRATION EQUIPMENT
Orville P. Nuffer, Evansville, Ind., assignor, by mesne assignments, to Baxter Laboratories, Inc., Morton Grove, Ill., a corporation of Delaware
Filed Mar. 10, 1958, Ser. No. 720,491
4 Claims. (Cl. 128—214)

This invention relates to intravenous infusion equipment and more particularly to a pediatric flow rate measuring adaptor for use with existing infusion equipment.

Intravenous infusion equipment normally includes some means for measuring the flow rate of the infusion liquid, as a drip chamber in which the flow rate is measured by counting the drops of liquid formed from a drip tube in a predetermined period of time. Drip tubes designed for general use have a size such that ten drops equal one cubic centimeter of liquid and with a normal adult flow rate of up to twenty cubic centimeters of liquid per minute, flow rates may readily be set in a matter of ten or twenty seconds. With infants, however, the normal infusion rate is of the order of one to three cubic centimeters per minute, or ten to thirty drops per minute. This slow rate is difficult to set accurately, and requires substantially more time to adjust.

A principal object of the present invention is the provision of an intravenous infusion system including a pediatric flow rate measuring adaptor, with which the relatively slow infusion rates for infants may accurately be set in a relatively short time.

One feature of the invention is the provision of an adaptor having an inlet connectable with a liquid infusion system, a cannula secured to and depending from the adaptor and providing an outlet therefor, and means for securing the adaptor into an infusion system with the lower end of the cannula being visible, so that the flow rate may be determined by the rate of drop formation of liquid coming through the cannula. Another feature is that the cannula extends through the inlet tube of a drip chamber and is visible through the walls of the chamber. Still another feature is that the adaptor is provided with a sleeve surrounding the cannula and terminating short of the lower end thereof for receiving the inlet tube or spike of the drip chamber.

Further features and advantages of the invention will be readily apparent from the following specification and from the drawings, in which:

FIGURE 1 is an elevational view of intravenous infusion equipment embodying the invention;

FIGURE 2 is an enlarged elevational view of a pediatric adaptor embodying the invention together with a drip chamber;

FIGURE 3 is an enlarged section of a pediatric adaptor; and

FIGURE 4 is an elevational view of a packaged pediatric adaptor.

A slower flow rate could of course be provided by utilizing a drip chamber with an inlet drip tube of smaller dimension. However, most intravenous infusion equipment is prepackaged in a set including a drip chamber, infusion tubing, a flow control device, and in some cases, a filter and pumping apparatus. There are at least ten generally standard sets. If a special drip chamber were designed for pediatric use, this would result in duplicating the rest of the equipment, requiring the manufacturer, distributor and hospital to stock possibly twice as many infusion sets as at present. Accordingly, it is desirable to have an adaptor device which is usable with any of the existing infusion equipment sets.

Turning now to FIGURE 1 of the drawings, an embodiment of the invention is illustrated, as incorporated in an infusion set connected with a container 10 of infusion liquid. The infusion set includes the pediatric adaptor 11 which is connected with a stopper 12 in the mouth of bottle 10. Connected to the pediatric adaptor is a drip chamber 13 which in turn has connected to it a length of infusion tubing 14, provided with a cannula 15 at the lower end thereof. A flow regulator 16 is mounted on the tubing and provides means for varying the cross-sectional opening of the tubing to control the flow rate therethrough. An air inlet and filter 17 is inserted through stopper 12 and communicates with air inlet tube 18, within the container 10.

Turning now to FIGURE 2 it is seen that the pediatric adaptor 11 includes a spike portion 20 insertable through the stopper 12 and a manually engageable flange 21 for facilitating manipulation of the device. Secured to the spike 20 is an elongated cannula 22 which extends downwardly therefrom. A sleeve 23, of a resilient material, as polyvinyl plastic tubing is likewise secured to spike 20 and depends therefrom with the cannula 22 extending beyond the lower end of sleeve 23 about one-half inch.

Drip chamber 13 has a spike portion 24 providing an inlet which communicates with drip tube 25 extending into and visible through the walls of the chamber. The infusion tubing 14 is connected with the lower end of drip chamber 13 through a rubber member 26 which may be deformed axially to effect a pumping operation, in order to fill the drip chamber partially at the start of the infusion operation.

The spike 24 of the drip chamber is inserted into the sleeve 23 connected with adaptor 11, the cannula 22 extending downwardly through the drip tube 25, projecting below it into the chamber 13, and being visible through the walls thereof. Thus, the liquid flowing from the container 10 passes through cannula 22 directly into the drip chamber and forms drops of a size determined by the bore of the cannula. This bore is selected to provide a drop size which permits rapid and accurate setting of relatively slow infusion rates.

The adaptor 11 may, of course, be used with any of the various types of infusion equipment, as straight infusion sets, blood administration sets, sets incorporating pumping equipment and the like. The only requirement is that the adaptor be joined with a portion of the equipment in which the projecting lower end of cannula 22 is visible so that the drop formation may be observed.

The construction of the adaptor itself is best illustrated in FIGURE 3. The spike 20 and flange 21 are formed as a single element, with a bore 27. A hub 28 at the lower end of the element receives a fitting 29 which has a reduced bore 30 in which is seated the upper end of cannula 22. The outer surface of element 29 is stepped, with the upper end of sleeve 23 expanded about the center portion 31 thereof. A shoulder 32 is provided at the upper end of element 29.

In one embodiment of the invention a twenty gauge cannula having a bore of about 0.022 inch is used for element 22. The drops formed by this cannula are of such a size that sixty are required to make up one cubic centimeter of liquid, with most intravenous solutions. With such a small drop size, relatively slow flow rates may be accurately set in a short period of time. With this particular size, drops per minute equal cubic centimeters per hour, a convenient relationship for determining the time required for the administration of a given volume of fluid.

In FIGURE 4, the pediatric adaptor 11 is illustrated as packaged in a sterile condition. Cover 33 encloses and protects spike 20, while a cover 34 encloses the sleeve 23 and cannula 22, and is seated against shoulder 32.

In use, the operator merely removes the covers 33 and 34, inserts the spike 24 of a drip tube into sleeve 23, and then forces spike 20 of the adaptor through the outlet opening of the stopper 12 of a bottle of solution. The pump 26 is operated to start the flow of solution into the system, the infusion tubing 14 filled, the infusion started and the flow rate adjusted in the normal manner by observing the drop formation at the lower end of cannula 22.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In an intravenous infusion system, apparatus of the character described, comprising: a spike adapted for engagement with the outlet opening of a container of intravenous liquid; a cannula secured to and depending from said spike; a sleeve of resilient material secured to said spike and depending therefrom, surrounding but spaced from said cannula, said sleeve terminating above the lower end of said cannula; and a drip chamber having an inlet tube inserted in said sleeve and a depending drip tube in communication therewith, said cannula extending through said inlet and drip tubes and into said chamber, below the end of said drip tube.

2. In an intravenous infusion system, apparatus of the character described, comprising: an adaptor having an inlet connectable in a liquid infusion system; a cannula secured to and depending from said adaptor and providing an outlet therefor; a sleeve secured to said adaptor, surrounding said cannula and terminating above the lower end thereof; and a drip chamber having an inlet tube inserted in said sleeve and a depending drip tube, said cannula extending through said inlet and drip tubes into said chamber.

3. Apparatus for use in an intravenous infusion system including an intravenous liquid container and a drip chamber having a projecting tubular inlet, comprising: a spike adapted for engagement with the outlet opening of the intravenous liquid container; a cannula secured to and depending from said spike; and a sleeve of generally tubular resilient material secured to said spike and depending therefrom, surrounding but radially spaced from said cannula and being arranged to grip the projecting tubular inlet of the drip chamber, said sleeve terminating above the lower end of said cannula, and said lower end of the cannula being adapted to function as a drop-forming element.

4. The apparatus of claim 3 wherein the cannula comprises a tubular member arranged to provide a slow infusion rate in the infusion system, said tubular member being provided with a bore having a small diameter such as approximately .022 inch.

References Cited in the file of this patent

UNITED STATES PATENTS

| | | |
|---|---|---|
| 2,473,153 | Lager | June 14, 1949 |
| 2,681,654 | Ryan et al. | June 22, 1954 |
| 2,689,564 | Adams et al. | Sept. 21, 1954 |
| 2,702,034 | Walter | Feb. 15, 1955 |
| 2,704,544 | Ryan | Mar. 22, 1955 |
| 2,712,822 | Gewecke | July 12, 1955 |
| 2,715,905 | Ogle | Aug. 23, 1955 |
| 2,746,455 | Abel | May 22, 1956 |